(12) United States Patent
Asada et al.

(10) Patent No.: US 6,594,042 B2
(45) Date of Patent: Jul. 15, 2003

(54) OPTICAL ELEMENT, OPTICAL PICKUP, INFORMATION RECORDING AND REPRODUCING METHOD, AND POLARIZING HOLOGRAM

(75) Inventors: Junichi Asada, Ibaraki (JP); Seiji Nishiwaki, Kobe (JP); Youichi Saitoh, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/020,475

(22) Filed: Dec. 12, 2001

(65) Prior Publication Data

US 2002/0114073 A1 Aug. 22, 2002

(30) Foreign Application Priority Data

Dec. 14, 2000 (JP) ........................................ 2000-380991

(51) Int. Cl.[7] ................................................. G02B 5/32
(52) U.S. Cl. ............................ 359/15; 359/1; 359/566; 369/112.1; 369/112.15; 369/110.02; 369/110.03; 369/110.04
(58) Field of Search ............................. 359/15, 1, 484, 359/566; 369/112.1, 112.15, 110.02, 110.03, 110.04, 112.16; 349/9

(56) References Cited

U.S. PATENT DOCUMENTS 6,272,098 B1 * 8/2001 Takahashi .............. 369/112.17

* cited by examiner

*Primary Examiner*—John Juba
*Assistant Examiner*—Leo Boutsikaris
(74) *Attorney, Agent, or Firm*—RatnerPrestia

(57) ABSTRACT

An optical element that receives a first incident light and a second incident light through a main surface and allowing the first and second incident lights to be transmitted therethrough, the first and second incident lights being linearly polarized lights having substantially orthogonal polarizing directions and having different wavelengths $\lambda 1$ and $\lambda 2$ respectively, the optical element receiving a first reflected light and a second reflected light generated when the first and second incident lights are reflected from a reflector through the other face, and allowing the first and second reflected lights to be transmitted therethrough again, the optical element has a polarizing hologram that allows the first incident light, the second incident light, and the second reflected light to be transmitted therethrough upon receiving these lights and that diffracts the first reflected light upon receiving this light; and at least one wavelength plate that varies at least one of polarizing states of all of the first incident light and reflected light and polarizing states of all or part of the second incident light and reflected light.

11 Claims, 5 Drawing Sheets

OPTICAL ELEMENT, OPTICAL PICKUP, INFORMATION RECORDING AND REPRODUCING METHOD, AND POLARIZING HOLOGRAM

BACKGROUND OF THE INVENTION

1. Field of the Invention

The present invention relates to an optical pickup used to record or reproduce signals on or from optical disks, and an optical element, a light irradiating method, and a polarizing hologram which are used to construct the optical pickup.

2. Description of the Related Art

The prior art will be described with reference to FIGS. 4 and 5. FIG. 4B shows a sectional configuration of a conventional optical element and part of an optical system of an optical pickup using this optical element. Further, FIG. 4A is a plan view showing the shape of a pattern for aperture restricting means for use in this optical element. Two lights of different wavelengths, for example, a light of 650 nm wavelength used for recording or reproducing signals on or from DVDs or the like and a light of 800 nm wavelength used for recording or reproducing signals on or from CDs or the like, impinge on and pass through this element.

In these figures, the optical element is formed of a glass substrate 61, another glass substrate 63, a polarizing hologram 62 composed of an uneven grating made of a refractive-index-anisotropic material, and a wavelength plate 66, both the polarizing plate and the wavelength plate being sandwiched between the glass substrates 61 and 63. The wavelength plate 66 has an optical thickness as applies a phase difference to the wavelength of 650 nm which difference equals five-fourths of the wavelength. This corresponds to the application of a phase difference to the wavelength of 800 nm which difference equals about one wavelength.

The polarizing hologram is formed of an uneven grating composed of a refractive-index-anisotropic material (for example, refractive indices n1 and n2) and having a depth d1 and an isotropic material having the same refractive index as either of the two refractive indices of the anisotropic material in recesses in the grating (for example, the refractive index n1) In general, when light passing through the grooves is assumed to have a phase difference $\phi$, a transmittance T is expressed as follows:

[Equation 1]

$$T = \cos^2(\phi/2) \qquad \text{(Equation 1)}$$

When the refractive indices of the grating for lights having orthogonal polarizing directions are defined as n1 and n2, a polarized light that is parallel with the direction in which the grating exhibits the refractive index n1 has the following phase difference:

[Equation 2]

$$\phi = 0 \qquad \text{(Equation 2)}$$

Accordingly, the transmittance is 1.

On the other hand, a polarized light of which polarization is orthogonal to the direction in which the grating exhibits the refractive index n1 has the following phase difference:

[Equation 3]

$$\phi = 2\pi(n1-n2)d1/\lambda \qquad \text{(Equation 3)}$$

Thus, if a depth d1 is set so that:

[Equation 4]

$$\phi = \pi \qquad \text{(Equation 4)}$$

then, the transmittance will be zero and the light will be totally diffracted. In the above equations, the 650-nm light shown in FIG. 4 corresponds to a wavelength $\lambda 1$, and the 800-nm light corresponds to a wavelength $\lambda 2$.

That is, when a linearly polarized light is incident on this grating, all the incident light is transmitted therethrough because the anisotropic material does not substantially function as a diffraction grating for the polarizing direction in which the anisotropic material exhibits the refractive index n1. On the other hand, the material functions as a diffraction grating for a polarizing direction orthogonal to the above polarizing direction and diffracts the incident light.

In FIG. 4B, of the lights emitted from two light sources having different wavelengths, a light of a wavelength $\lambda 1$ is linearly polarized and has a polarizing direction parallel with the sheet of the drawing, and a light of a wavelength $\lambda 2$ has a polarizing direction perpendicular to the sheet of the drawing. The light of the wavelength $\lambda 1$ is reflected by a wavelength separating filter 70 and is incident on an optical element 72. On the other hand, the light of the wavelength $\lambda 2$ has its polarization plane rotated through 90° by a half wavelength plate 71 to become a linearly polarized light having a polarizing direction parallel with the sheet of the drawing. This linearly polarized light passes through the wavelength separating filter 70 and enters the optical element 72.

Accordingly, the respective polarizing directions of light, upon impinging on the element, corresponds to the direction in which the grating of the polarizing hologram exhibits a refractive index of n1. Thus, all light entering the optical element passes through the polarizing hologram 62 regardless of the wavelength.

A light of 650 nm wavelength passes through the polarizing hologram 62 and is then converted into a circularly polarized light by a wavelength plate 66 that applies a phase difference to this wavelength which difference equals five-fourths of the wavelength. Then, the light exits the element and is then reflected by the reflector 67 to follow a backward path. On this path, the light is converted by the wavelength plate 66 into a linearly polarized light of which a direction of polarization is orthogonal to that of the forward path. Therefore, the light is totally diffracted by the polarizing hologram 62.

On the other hand, after passing through the polarizing hologram 62, a light of 800 nm wavelength is not converted into any polarized light because it passes through the wavelength plate 66 having an optical thickness substantially equal to one wavelength. The light is then reflected by the reflector 67 to travel along the backward path, and also on this path, the light is not converted into any polarized light. Consequently, as in the case with the forward path, the light is not diffracted by the polarizing hologram 62. More generally speaking, when the wavelengths of the two light sources are defined as $\lambda 1$ and $\lambda 2$, the wavelength plate 66 is designed under the following conditions:

[Equation 5]

$$(N1+1/4)\lambda 1 \approx N2 \times \lambda 2 \, (N1 \text{ and } N2 \text{ are integers}) \qquad \text{(Equation 5)}$$

In this case, the light of 650 nm wavelength corresponds to the wavelength $\lambda 1$, and the light of 800 nm wavelength corresponds to the wavelength $\lambda 2$.

Further, one 63 of the glass substrates has a wavelength-selective optical thin film formed thereon and which varies the transmittance depending on the wavelength of light passing through the glass substrate, that is, an aperture restricting film 68. In this case, since the light of 650 nm wavelength is totally transmitted through the aperture restricting film 68 (which is formed like a ring in the area A in FIGS. 4A and 4B), a phase compensating film 69 is formed in an area B so as not to create a phase difference between a light passing through the area A and a light passing through the area B, which is located in the vicinity of the center of the element.

On the other hand, the light of 800 nm wavelength has such film design conditions that it exhibits a high transmittance only in the area B in the figures and does not substantially pass through the area A. By blocking the light in the area A, the aperture is restricted.

As described above, when two lights of different wavelengths pass through the optical element 72 forward and backward, one of the lights is substantially totally transmitted through the element on the forward path and is totally diffracted on the backward path by the polarizing hologram 62. Further, this light is subjected to no aperture restrictions by aperture restricting film 68. The other light undergoes no diffraction by the polarizing hologram 62 on the forward or backward path, but undergoes aperture restrictions by the aperture restricting film 68.

An optical element having such functions can be used for an optical pickup having a plurality of light sources with different wavelengths, for example, as an element used for an optical pickup or the like as shown in FIG. 5. This will be described below.

FIG. 5 shows the configuration of optical systems of an optical pickup using the conventional optical element shown in FIG. 4. In the optical pickup in the conventional example shown in the figure, two optical systems having different light source wavelengths and NAs share one objective lens 107 and a conventional optical element 117 mounted on an actuator movable unit 106 together with the objective lens 107.

In general, in an optical disk comprising two optical systems that carries out recording and reproduction, the optical systems have different material thicknesses (for example, 0.6 mm for DVDs and 1.2 mm for CDs), so that the optical systems are optimized by setting one of them to be finite and the other to be infinite to correct a spherical aberration resulting from the difference of the material thickness, while varying the aperture for lights entering the same objective lens through the two optical systems. That is, an optical system configuration is implemented which has two optical systems having different light source wavelengths and optimal NAs but which requires only one objective lens.

In FIG. 5, the optical pickup has as light sources two semiconductor lasers 101 (wavelength $\lambda 1$) and 115 (wavelength $\lambda 2$) having different wavelengths, a photodetector 109 arranged in the vicinity of the semiconductor laser 101, and a photodetector 110 arranged in the vicinity of the semiconductor laser 115, the semiconductor lasers and photodetectors being integrated together. Further, lights emitted from the semiconductor lasers have orthogonal polarizing directions; the polarizing direction of a light emitted from the semiconductor laser 101 is parallel with the sheet of the drawing, while the other polarizing direction of a light emitted from the semiconductor laser 115 is perpendicular to the sheet of the drawing.

In general, a light beam exiting a semiconductor laser is radiated in an elliptic form and has a long elliptic axis perpendicular to an interface of a laser chip and a short elliptic axis parallel with the interface. Further, the beam becomes a linearly polarized light of which a polarizing direction is parallel with the interface of the laser chip.

A laser light of the wavelength $\lambda 1$ exiting the semiconductor laser light source 101, of which a polarizing direction is parallel with the sheet of the drawing, that is, has a radiation pattern having a long elliptic axis perpendicular to the sheet of the drawing. This light is converted into a parallel light by a collimator lens 102, and the parallel light passes through a beam shaping prism 104, where the diameter of the cross section of the beam flux is increased only in the drawing plane direction to shape the light of an elliptic cross section into a light of a circular cross section. Most of the beam-shaped light is reflected from a wavelength separating filter 103, while part of the light is transmitted therethrough. The transmitted light has its quantity detected by a photodetector 116, and is used to control the quantity of light exiting the semiconductor laser 101.

On the other hand, a light reflected by the wavelength separating filter 103 passes through the optical element 117 mounted on the actuator movable unit 106, that is, the optical element shown in FIG. 4.

In this case, alight emitted from the semiconductor laser 101 has a polarizing direction in which the grating of the polarizing hologram of the optical element 117 is invisible on the forward path (this direction is parallel with the sheet of the drawing). This light is converted into a circularly polarized light by a wavelength plate having an optical thickness that allows the application of a phase difference $5/4\ \lambda 1$, shown in FIG. 4 (a phase difference $\lambda 2$ for the wavelength $\lambda 2$). The aperture for this light is not controlled by the aperture restricting film of the optical element 117 but only by the actuator movable unit 106.

The circularly polarized light is condensed on a signal surface of the optical disk 108 by the objective lens 107 and reflected by the signal surface, and then passes through the objective lens 107 again. The wavelength plate of the optical element 117 then converts the light into one having a polarizing direction orthogonal to that of the forward path, which is then totally diffracted by the polarizing hologram of the optical element 117. The diffracted light travels through the optical system in the opposite direction compared to the forward path and is then condensed on the photodetector 109, where the quantity of light is detected to obtain a control signal and a reproduced signal.

On the other hand, the other laser light of the wavelength $\lambda 2$ exiting the semiconductor laser 115 passes through a hologram 114 and is condensed on a collimator lens 111. The light has its polarization plane rotated through 90° by a half wavelength plate 118, passes through the wavelength separating filter 103, and then impinges on the optical element 117.

That is, when the light of the wavelength $\lambda 2$ is incident on the optical element 117, its polarizing direction is, like the light of the wavelength $\lambda 1$, the direction in which the grating of the polarizing hologram of the optical element is invisible. Thus, on the forward path, the light is not diffracted by the grating. Further, the optical thickness of the wavelength of the optical element 117 allows the application of a phase difference equal to one wavelength compared to the light of the wavelength $\lambda 2$, so that the polarizing state also remains unconverted.

A light transmitted through the wavelength plate of the optical element 117 has its aperture restricted by the aperture restricting film of the optical element 117 and then enters the objective lens 107. The light is then condensed, by the objective lens 107, on a signal surface of an optical disk 112 having a different material thickness. The light reflected by the optical disk 112 passes through the optical element 117 without being diffracted because it is also polarized, on the backward path, in the direction in which the grating of the polarizing hologram is invisible. The transmitted light then passes through the wavelength separating filter 103, the half wavelength plate 118, and the collimator lens 111, is subsequently diffracted by the hologram 114, and then enters a detection surface of the detector 110 to detect a signal.

In this case, since the optical element 117, which diffracts and branches the light of the wavelength $\lambda 1$ on the backward path, is mounted on the actuator movable unit 106, a signal offset can be reduced which may occur when the objective lens 107 shifts so as to follow the deviation of the center of the disk. That is, a push-pull tracking detection method using the diffraction of light based on an uneven structure is used for recording or reproducing signals on or from high-density disks such as DVDs which have an uneven land/groove structure. However, if this detection method is used and the relative position between the objective lens and polarizing hologram deviates owing to a lens shift, then the distribution of the quantity of light in the aperture is also shifted to vary the quantity of light diffracted by the polarizing hologram, causing a DC offset in the control signal. This offset may cause an error in the control of a spot position with respect to a track center, and since the high-density disk has a small inter-track pitch, the margin of the positional error is very small. To prevent this, the polarizing hologram advantageously moves integrally with the objective lens.

Further, the light of the wavelength $\lambda 2$ is not affected by the diffraction by the polarizing hologram of the optical element 117 on the forward and backward path, but has its NA optimized by the aperture restricting film of the optical element 117.

By mounting the above described optical element 117 on the actuator movable unit 106, an optical system can be provided which comprises two optical systems having different wavelengths and NAs but sharing a single objective lens and which can reduce signal offsets in the detection system of one of the optical systems. Therefore, the configuration of the optical system of the optical pickup can be simplified and miniaturized.

However, such a conventional optical element and a conventional optical pickup using it has the following problems: if a conventional optical element based on the above described principle is used, two lights of different wavelengths incident on the element on the forward path of the optical system must have the same polarizing direction when emitted from their light sources.

On the other hand, if the layout of the optical system is to be determined with a limited space, it may be advantageous that two laser light sources have different polarization planes as in the conventional example. For example, in an optical system that shapes a beam using a beam shaping prism as shown in the conventional example, the arrangement of the lasers determines the direction in which the beam is shaped, so that the shape and size of the lasers are related to the design of the arrangement. Furthermore, a unit form in which two laser light sources are integrated with detectors as shown in the conventional example requires a large number of design considerations such as the increased sizes of the units and the installation of terminals used to obtain laser drive current or detector output current flowing between the units as well as flexible cables joined to the terminals. Consequently, a higher degree of freedom is required for the layout of the light sources.

In this case, as in the conventional example, one of the optical systems must have a half wavelength plate with its polarization plane rotated through 90° so that lights emitted from the respective laser units have the same polarizing direction when entering the optical element. However, this increases the number of parts required for the optical systems, the costs of the optical pickup, and the number of assembly steps.

That is, for the conventional optical element and the conventional optical pickup etc. using it, the degree of freedom of the layout of the optical systems must be sacrificed or the number of optical parts must be increased because of the characteristics of the optical element.

SUMMARY OF THE INVENTION

The present invention is provided in view of these problems, and it is an object thereof to provide an optical element and an optical pickup etc. using it which ensures a sufficient degree of freedom of the layout of optical systems and which enables the construction of optical systems with a reduced number of optical parts.

One aspect of the present invention is an optical element that receives a first incident light and a second incident light through a main surface and allowing the first and second incident lights to be transmitted therethrough, the first and second incident lights being linearly polarized lights having substantially orthogonal polarizing directions and having different wavelengths $\lambda 1$ and $\lambda 2$ respectively, the optical element receiving a first reflected light and a second reflected light generated when said first and second incident lights are reflected from a reflector through the other face, and allowing the first and second reflected lights to be transmitted therethrough again, the optical element comprising:

a polarizing hologram that allows said first incident light, said second incident light, and said second reflected light to be transmitted therethrough upon receiving these lights and that diffracts said first reflected light upon receiving this light; and at least one wavelength plate that varies at least one of polarizing states of all of said first incident light and reflected light and polarizing states of all or part of said second incident light and reflected light.

Another aspect of the present invention is the optical element further comprising aperture restricting means of allowing said first incident light to be transmitted through the optical element, while reducing a transmission area of said second incident light.

Still another aspect of the present invention is the optical element, wherein said wavelength plate applies a phase difference of $(N+1/4)\cdot\lambda 1$ ($N=1, 2, 3, \ldots$) to a wavelength $\lambda 1$ of said first incident light and reflected light, and applies a phase difference of $M\cdot\lambda 2$ ($M=1, 2, 3, \ldots$) to a wavelength $\lambda 2$ of said second incident light and reflected light, and wherein when a difference of the reference indexes between groove portions of said polarizing hologram is defined as $\Delta n1$ for said first incident light, as $\Delta n2$ for a light having the same wavelength as the first incident light and having a polarizing direction orthogonal to that of the first incident light, and as $\Delta n2'$ for said second incident light, a depth d of the groove portion of the polarizing hologram meets the following relationship:

$d = m\cdot\lambda 1\cdot(1/\Delta n1)$ (m=0, 1, 2, 3, . . . )

$d = (2k-1)\cdot\lambda 1\cdot(1/\Delta n2)$ (k=1, 2, 3, . . . )

$d = L\cdot\lambda 2\cdot(1/\Delta n2')$ (L=0, 1, 2, 3, . . . )

Yet another aspect of the present invention is the optical element, wherein said wavelength plate comprises a first wavelength plate and a second wavelength plate, and wherein said first wavelength plate and said second wavelength plate are arranged opposite each other via said polarizing hologram.

Still yet another aspect of the present invention is the optical element, wherein said second wavelength plate is provided on a side of the optical element on which the second wavelength plate can receive said first and second incident lights.

A further aspect of the present invention is the optical element, wherein said first wavelength plate applies a phase difference of $(N+1/4)\cdot\lambda 1$ ($N=1, 2, 3, \ldots$) to a wavelength $\lambda 1$ of said first incident light and reflected light, and applies a phase difference of $M\cdot\lambda 2$ ($M=1, 2, 3, \ldots$) to a wavelength $\lambda 2$ of said second incident light and reflected light, and wherein said second wavelength plate applies a phase difference to said wavelength $\lambda 1$ which difference is an integral multiple of the wavelength $\lambda 1$, and applies a phase difference of $(m+1/2)\cdot\lambda 2$ ($m=0, 1, 2, \ldots$) to said wavelength $\lambda 2$.

A still further aspect of the present invention is the optical element, wherein said second wavelength plate and said polarizing hologram function as aperture restricting means of reducing a transmission area of light passing therethrough.

A yet further aspect of the present invention is the optical element, wherein said first wavelength plate applies a phase difference of $(N+1/4)\cdot\lambda 1$ ($N=1, 2, 3, \ldots$) to a wavelength $\lambda 1$ of said first incident light and reflected light, and applies a phase difference of $M\cdot\lambda 2$ ($M=1, 2, 3, \ldots$) to a wavelength $\lambda 2$ of said second incident light and reflected light, and wherein said second wavelength plate has a first area that applies a phase difference of $m\cdot\lambda 1$ ($m=1, 2, 3, \ldots$) to said wavelength $\lambda 1$ and that applies a phase difference of $(k+1/2)\cdot\lambda 2$ ($k=0, 1, 2, \ldots$) to said wavelength $\lambda 2$, and a second area that applies a phase difference to both of said wavelengths $\lambda 1$ and $\lambda 2$ which difference is an integral multiple of the respective wavelengths.

A still yet further aspect of the present invention is an optical pickup comprising:

an optical element set forth in any of 1st to 8th inventions;

a first laser light source and a second laser light source that emit a first incident light and a second incident light, respectively, which are linearly polarized lights having substantially orthogonal polarizing directions and which have different wavelengths $\lambda 1$ and $\lambda 2$;

condensing means of condensing said first incident light and said second incident light;

objective lens means of condensing light emitted from said collecting means, on a reflector, the objective lens means having said optical element mounted thereon;

an actuator that finely moves said objective lens means; and detecting means of detecting a first reflected light generated when said first incident light is reflected from said reflector and a second reflected light generated when said second incident light is reflected from said reflector.

An additional aspect of the present invention is an information recording and reproducing method of irradiating each of two different types of recording media with a first incident light or a second incident light which are linearly polarized lights having substantially orthogonal polarizing directions and which have different wavelengths $\lambda 1$ and $\lambda 2$, respectively, to obtain a first reflected light generated when the first incident light is reflected from one of said recording media or a second reflected light generated when the second incident light is reflected from the other recording medium, thereby recording or reproducing information on or from said two types of recording media; the method comprising the steps of:

receiving the first reflected light or the second reflected light and allowing the first and second reflected lights to pass through again;

allowing said first incident light, said second incident light, or said second reflected light to pass through upon receiving these lights, and diffracting said first reflected light upon receiving this light; and varying at lease one of polarizing states of all of said first incident light and reflected light and polarizing states of all or part of said second incident light and reflected light.

A still additional aspect of the present invention is a polarizing hologram wherein when a difference of the refractive indexes between groove portions of said polarizing hologram is defined as $\Delta n1$ for a first incident light, as $\Delta n2$ for a light having the same wavelength as said first incident light and having a polarizing direction orthogonal to that of the first incident light, and as $\Delta n2'$ for a second incident light, a depth d of the groove portion of the polarizing hologram meets the following relationship:

$d=m\cdot\lambda 1\cdot(1/\Delta n1)$ ($m=0, 1, 2, 3, \ldots$)

$d=(2k-1)\cdot\lambda 1\cdot(1/\Delta n2)$ ($k=0, 1, 2, 3, \ldots$)

$d=L\cdot\lambda 2\cdot(1/\Delta n2')$ ($L=0, 1, 2, 3, \ldots$).

Figure 1A:
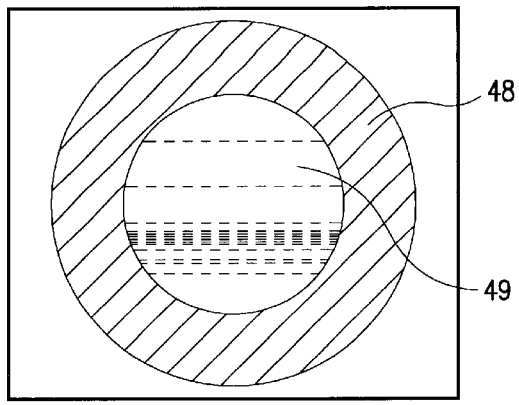
FIGS. 1A and 1B are views showing the sectional structure of an optical element according to Embodiment 1 of the present invention and a part of an optical system of an optical pickup using this optical element.

DESCRIPTION OF SYMBOLS 1, 2, 3, 21, 22, 23, 41, 43 Glass substrates
4 Wavelength plate B
5, 25, 42 Polarizing holograms
6, 26 Wavelength plates A
7, 27, 47 Reflectors
8, 30, 50 Wavelength separating filters
9, 31, 51 Optical elements
24 Wavelength plate C 28, 48 Aperture restricting film
46 Wavelength plate
29, 49 Phase compensating film

DETAILED DESCRIPTION OF THE PREFERRED EMBODIMENTS

The present invention will be described below with reference to the drawings showing embodiments thereof.
(Embodiment 1)

Figure 1B:
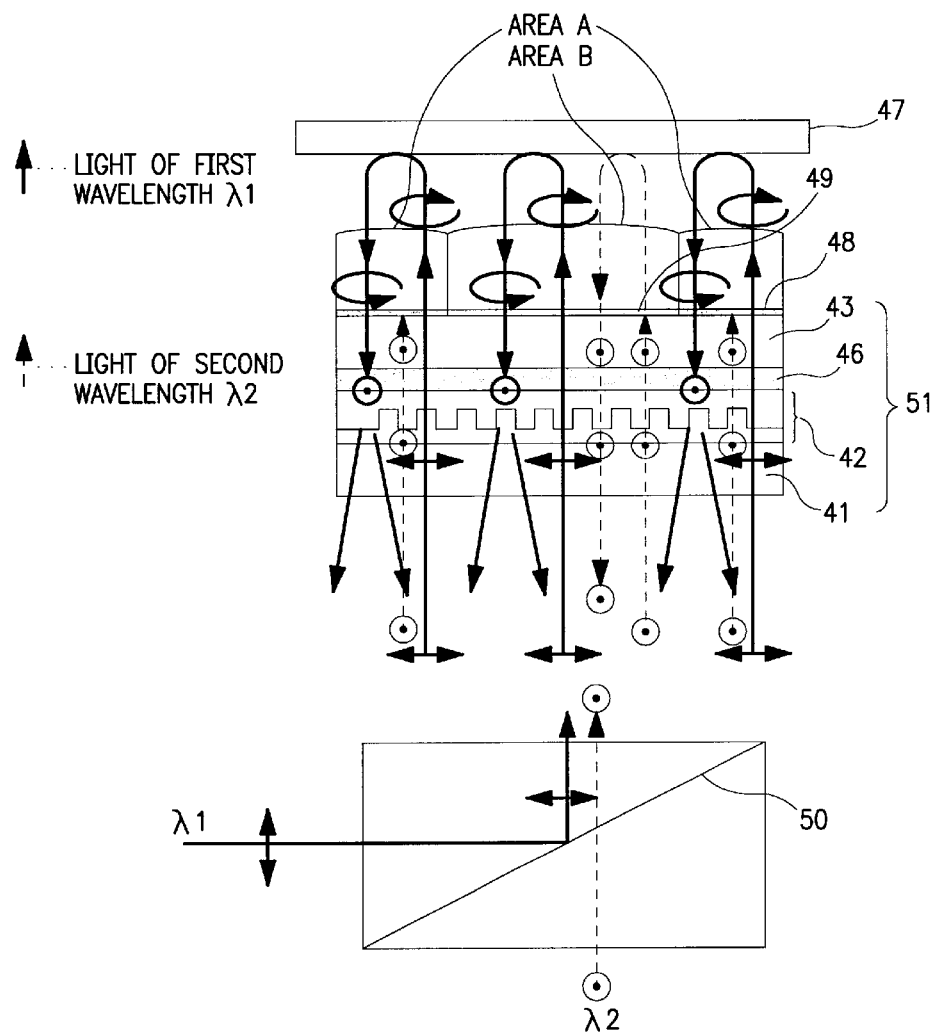

FIG. 1B shows the sectional structure of an optical element according to Embodiment 1 of the present invention and a part of an optical system of an optical pickup using this optical element. Further, FIG. 1A is a plan view showing a formation pattern of an aperture restricting means used in the optical element of the present invention. In the configuration in FIG. 1, an optical element 51 comprises two glass substrates 41 and 42, and a wavelength plate 46 and a polarizing hologram 42 both sandwiched between the glass substrates 41 and 42.

If two lights of different wavelengths $\lambda 1$ and $\lambda 2$ are incident on the element, the wavelength plate 46 applies a phase difference $(N+1/4)\cdot\lambda 1$ ($N=1, 2, 3, \ldots$) to the wavelength $\lambda 1$, and applies to the wavelength $\lambda 2$ a phase difference equal to an integral multiple of the wavelength, that is, $M\cdot\lambda 2$ ($M=1, 2, 3 \ldots$). The relationship between the two wavelengths $\lambda 1$ and $\lambda 2$ may be either $\lambda 1 > \lambda 2$ or $\lambda 1 < \lambda 2$. This relationship is also for the embodiments described later.

Lights emitted from two light sources with different wavelengths have orthogonal polarizing directions. Before entering the optical element 51, a light of a wavelength 1 (linearly polarized light of which the polarizing direction is parallel with the sheet of the drawing) is reflected by a wavelength separating filter 50, and a light of a wavelength $\lambda 2$ (linearly polarized light of which the polarizing direction is perpendicular to the sheet of the drawing) passes through the wavelength separating filter 50.

Accordingly, immediately before impinging on the optical element 51, the lights of the different wavelengths have orthogonal polarizing directions and impinge on one main surface of the optical element 51 (forward path). A light transmitted through the element is reflected by a reflector 47 (for example, a recording medium such as an optical disk), subsequently falls on the other main surface of the optical element 51, and then passes through the optical element 51 again (backward path).

When a difference in refractive index between groove portions of the polarizing hologram 42 is defined as $\Delta n1$ for a light having a wavelength $\lambda 1$ and an incident polarizing direction (parallel with the lateral direction within the sheet of the drawing) and as $\Delta n2$ for a light having a polarizing direction orthogonal to the polarizing direction (that is, perpendicular to the sheet of the drawing) of the incident light, the depth d of the groove portions of the polarizing hologram 42 meets the following relationship:
[Equation 6]

$$d = m \cdot \lambda 1 \cdot (1/\Delta n1) \quad (m=1, 2, 3, \ldots) \quad \text{(Equation 6)}$$

and
[Equation 7]

$$d = (2k-1) \cdot \lambda 1 \cdot (1/\Delta n2) \quad (k=1, 2, 3, \ldots) \quad \text{(Equation 7)}$$

The depth d also meets the following relationship for a light having a wavelength $\lambda 2$ and a polarizing direction orthogonal to that of the incident light of the wavelength $\lambda 1$:
[Equation 8]

$$d = L \cdot \lambda 2 \cdot (1/\Delta n2) \quad (L=1, 2, \ldots) \quad \text{(Equation 8)}$$

Strictly speaking, the difference in refractive index between the groove portions of the polarizing hologram 42 is not exactly the same between the polarizing direction of the light of the wavelength $\lambda 1$ on the backward path and the polarizing direction of the light of the wavelength $\lambda 2$ on the forward path owing to the difference in wavelength (these polarizing directions are identical) However, the difference in the refractive index is so small that it is assumed that the refractive indexes are the same.

With these conditions met, when the light of the wavelength $\lambda 1$ is incident on the optical element 51, this incident light is substantially totally transmitted through the element because by substituting d in Equation 6 for d1 in Equation 3 and replacing (n1−n2) with $\Delta n1$, the phase difference $\phi$ between the grooves on the forward path becomes:
[Equation 9]

$$\phi = 2\pi, 4\pi, 6\pi, \quad \text{(Equation 9)}$$

On the other hand, on the backward path, when the light is incident on the optical element 51, its polarizing direction is rotated through 90° by the wavelength plate 46. At this time, the light of the wavelength $\lambda 1$ as a reflected light is substantially totally diffracted because by substituting d in Equation 7 for d1 in Equation 3 and replacing (n1−n2) with $\Delta n2$, the phase difference $\phi$ between the grooves becomes:
[Equation 10]

$$\phi = \pi, 3\pi, 5\pi, \quad \text{(Equation 10)}$$

On the other hand, on both the forward and backward paths, the light of the wavelength $\lambda 2$ is linearly polarized and its polarizing direction is orthogonal to the light of the wavelength $\lambda 1$ on the forward path. In this case, the light of the wavelength $\lambda 2$ as an incident and reflected light is substantially totally transmitted through the element by substituting d in Equation 8 for d1 in Equation 3 and replacing (n1−n2) with $\Delta n2$, the phase difference $\phi$ between the grooves becomes:
[Equation 11]

$$\phi = 2\pi, 4\pi, 6\pi, \quad \text{(Equation 11)}$$

According to the optical element of this embodiment, the above configuration enables one of two lights having different wavelengths and orthogonal polarizing directions to be totally transmitted through the element on the forward path and totally diffracted on the backward path, while enabling the other to be totally diffracted on both the forward and backward paths.

The light of the wavelength $\lambda 2$ has its aperture restricted by the aperture restricting film 48 formed on the glass substrate 43 as in the case with the conventional optical element. When the optical element 51 has such a configuration, even if lights from two laser light sources which are incident on the terminal and which have different wavelengths have orthogonal polarizing directions, a phase difference that may occur in the groove portions of the polarizing hologram 42 can be optimized to allow one of the lights (wavelength $\lambda 1$) to be totally transmitted through the element on the forward path and totally diffracted on the backward path, while allowing the other (wavelength $\lambda 2$) to be transmitted rather than diffracted on both the forward and backward paths. Thus, an optical system of an optical pickup using this optical element requires no half wavelength plate, thereby simplifying the optical system to reduce the number of required parts.

(Embodiment 2)

Figure 2A:
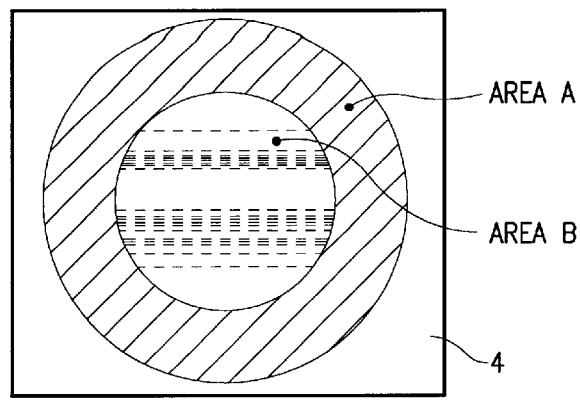
FIGS. 2A and 2B are views showing the sectional structure of an optical element according to Embodiment 2 of the present invention and a part of an optical system of an optical pickup using this optical element.
Figure 2B:
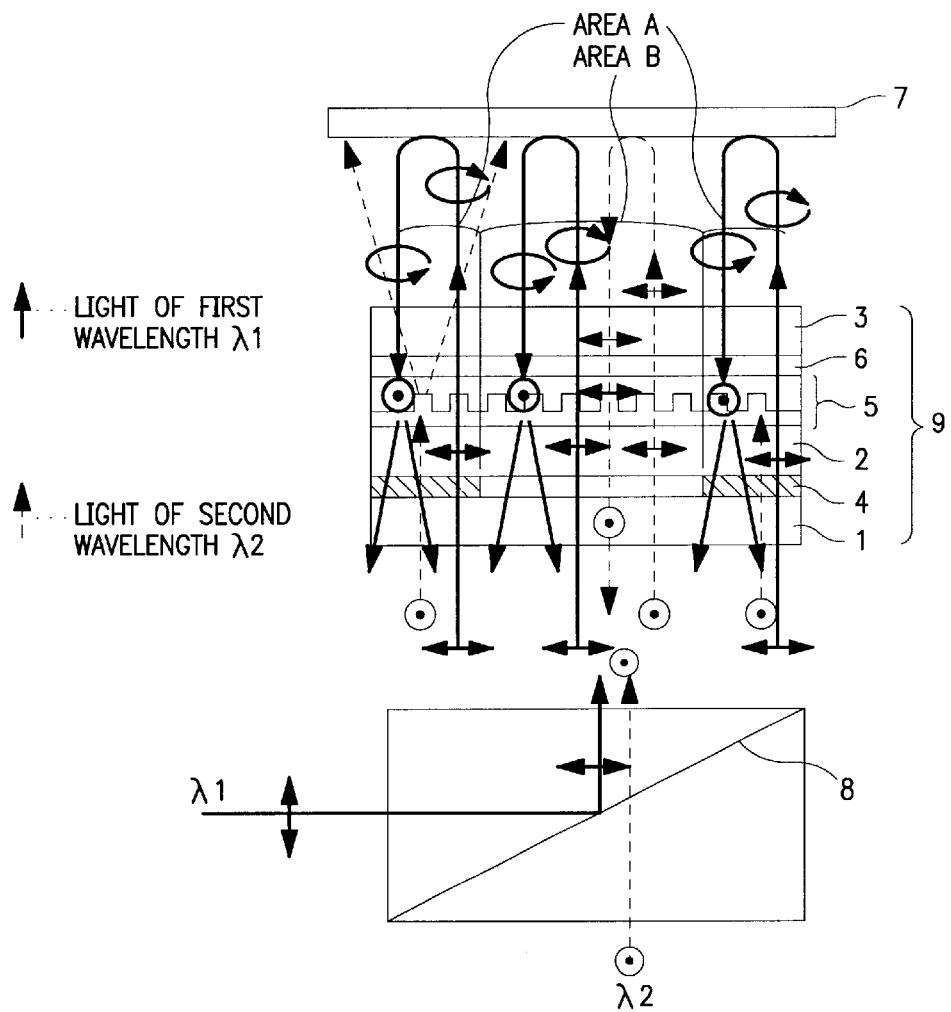

FIG. 2B shows the sectional structure of an optical element according to Embodiment 2 of the present invention and a part of an optical system of an optical pickup using this optical element. Further, FIG. 2A is a plan view showing a formation pattern of an aperture restricting means used in the optical element of the present invention. In the figures, the optical element is composed of three glass substrates, and a wavelength plate B4, a polarizing hologram 5, and a wavelength plate A6 each sandwiched between the glass substrates.

In this case, for two lights of different wavelengths entering the element, the wavelength plate B4 formed between the glass substrates 1 and 2 has, in a circular area (area B in the figure) centering on the center of the element, an optical thickness that allows the application of a phase difference to the wavelength $\lambda 1$ which difference is an integral multiple of the wavelength $\lambda 1$, that is, $m \cdot \lambda 1$ (m=1, 2, 3, . . . ) while allowing the application of a phase difference $(k+1/2) \cdot \lambda 2$ (k=0, 1, 2, . . . ) to the wavelength $\lambda 2$. In a ring area (a ring portion shown by the area A in the figure) outside the circular area, the optical thickness is such that both the wavelengths $\lambda 1$ and $\lambda 2$ are imparted with a phase difference equal to an integral multiple of the respective wavelengths.

Further, both the polarizing hologram 5 and the wavelength plate A6 are sandwiched between the glass substrates 2 and 3. For two lights of different wavelengths $\lambda 1$ and $\lambda 2$ entering the element, the wavelength plate A6 has an optical thickness that allows the application of a phase difference $(N+1/4) \cdot \lambda 1$ (N=1, 2, 3, . . . ) to the wavelength $\lambda 1$, while allowing the application of a phase difference to the wavelength $\lambda 2$ which is an integral multiple of the wavelength $\lambda 2$, that is, $M \cdot \lambda 2$ (M=1, 2, 3, . . . ).

Lights emitted from two light sources with different wavelengths have orthogonal polarizing directions. Before entering an optical element 9, a light of a wavelength 1 (linearly polarized light of which the polarizing direction is parallel with the sheet of the drawing) is reflected by a wavelength separating filter 8, and a light of a wavelength $\lambda 2$ (linearly polarized light of which the polarizing direction is perpendicular to the sheet of the drawing) passes through the wavelength separating filter 8.

Accordingly, as in Embodiment 1, immediately before impinging on the optical element 9, the two lights of the different wavelengths have orthogonal polarizing directions, and the polarizing hologram 5 is arranged in the direction in which its grating is invisible to the linearly polarized light of the wavelength $\lambda 1$ on the forward path.

That is, upon passing through the wavelength plate (or wavelength film) B4, the light of the wavelength $\lambda 1$ as an incident light is not affected by the polarizing state because it has a wavelength equal to an integral multiple of the wavelength $\lambda 1$ in both the areas A and B. On the forward path, this light has the polarizing direction in which the grating of the polarizing hologram 5 is invisible, and thus passes through the element without being diffracted by the polarizing hologram 5.

The transmitted light is converted into a circularly polarized light by the wavelength plate A6 having the optical thickness that allows the application of a phase difference $(N+1/4) \cdot \lambda 1$ (N=1, 2, 3, . . . ) and this circularly polarized light exits the optical element 9.

On the other hand, the light of the wavelength $\lambda 1$ of the backward path as a reflected light, reflected by the reflector 7, is totally diffracted by the polarizing hologram 5 because it is converted, by the wavelength plate 6, into a linearly polarized light of which the polarizing direction is orthogonal to that of the forward path. However, the diffracted light passes through the optical element 9 without being affected by the polarizing state in the area A or B as in the case with the forward path (incident light).

On the other hand, in the area B, the wavelength plate B4 subjects the light of the wavelength $\lambda 2$ as an incident light to the phase difference $(k+1/2) \cdot \lambda 2$ (k=0, 1, 2, . . . ) to rotate its polarizing direction through 90°. In the area A, this light is not affected by the polarizing state because it has an optical phase $m \cdot \lambda 1$ (m=1, 2, 3, . . . ).

The light having its polarizing state rotated through 90° in the area B is not diffracted by the polarizing hologram 5 because it has the same polarizing direction as that of the incident light of the wavelength $\lambda 1$. In contrast, the light transmitted through the area A is diffracted on the forward path by the polarizing hologram 5 because it is not affected by the polarizing state established by the wavelength plate B4 and its polarizing direction is the direction in which the grating of the polarizing hologram 5 can be seen. That is, upon passing through the optical element 9 and entering the objective lens, the light of the wavelength $\lambda 2$ is under the same conditions as those under which the aperture is restricted to the area B.

According to the optical element of this embodiment, such an element configuration enables the wavelength plate B4 to establish a uniform polarizing state all over the aperture even if lights from two laser light sources having different wavelengths have orthogonal polarizing directions. This element configuration also enables the aperture for the light of the wavelength $\lambda 2$ to be restricted on the basis of the combination of the wavelength plate B4 and the polarizing hologram 5. As a result, an optical element is obtained which has functions similar to those of Embodiment 1 and which requires no aperture restricting film.

If the optical thicknesses of the wavelength plate B4 in the areas A and B have the reverse relationship compared to the above description, the same aperture restricting function can be provided for two lights having the same polarizing state. In this case, the thin film for aperture restrictions need not be formed into an element. Further, in this case, the polarizing hologram 5 may have a brazed cross section in which the phase varies continuously between the groove portions.

Furthermore, in the above embodiment, the wavelength plate B4 is provided on the side of the optical element on which the incident light enters the element, or the wavelength plate A6 is provided on the side of the optical element on which the reflected light is incident on the optical element, but the wavelength plate A6 may be provided on the side of the optical element on which the incident light enters the element, or the wavelength plate B4 may be provided on the side of the optical element on which the reflected light is incident on the optical element.

(Embodiment 3)

Figure 3:
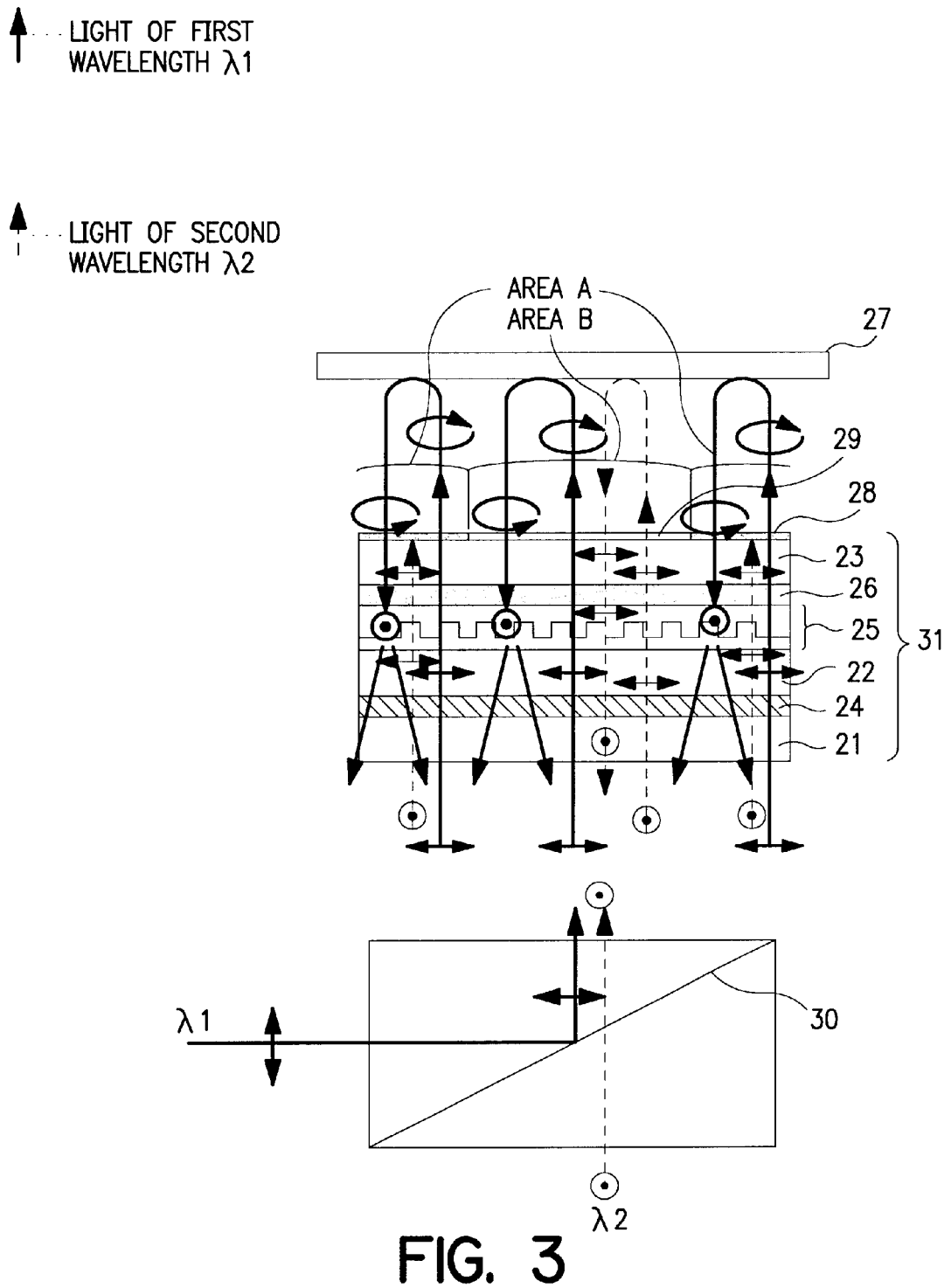
FIG. 3 is a view showing the sectional structure of an optical element according to Embodiment 3 of the present invention and a part of an optical system of an optical pickup using this optical element.
Figure 4A:
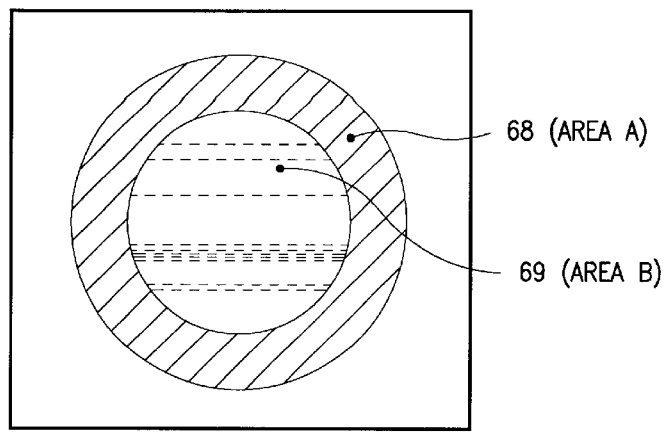
FIGS. 4A and 4B are views showing the sectional structure of a conventional optical element and a part of an optical system of an optical pickup using this optical element.
Figure 4B:
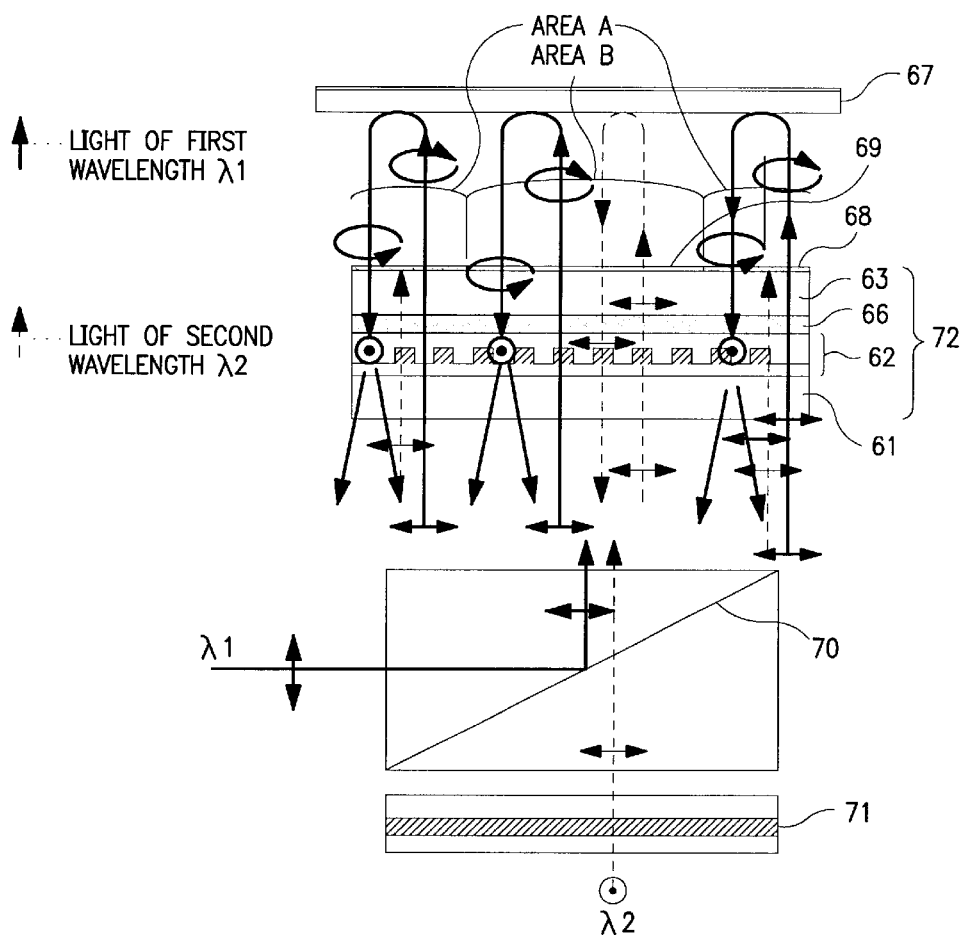
Figure 5:
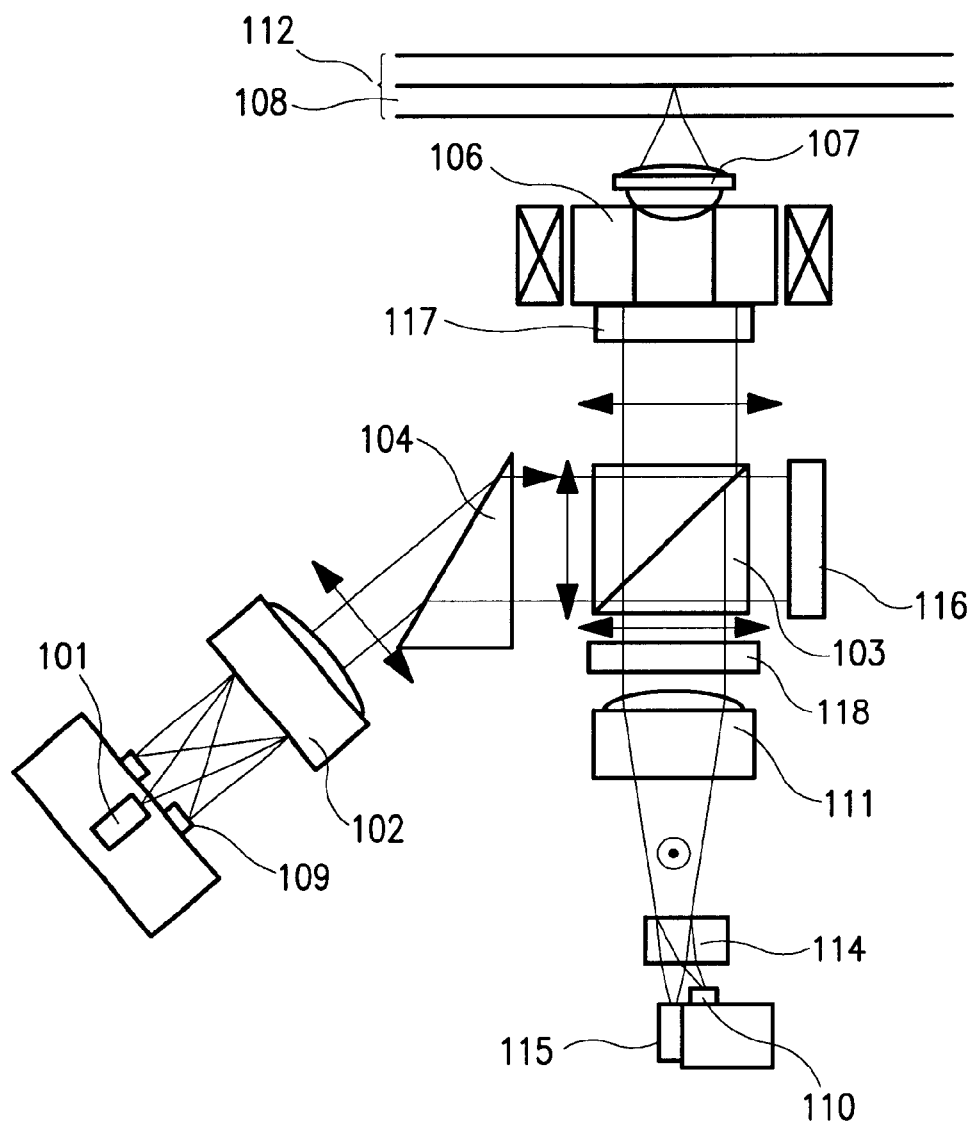
FIG. 5 is a schematic view showing the configuration of an optical pickup using a conventional optical element.

FIG. 3 shows the sectional structure of an optical element according to Embodiment 3 of the present invention and a part of an optical pickup using this optical element. In this figure, the optical element is composed of three glass substrates 21, 22, and 23; a wavelength plate (or wavelength film) C24, a polarizing hologram 25, and a wavelength plate A26 each sandwiched between the glass substrates; and an aperture restricting film 28 and a phase compensating film 29 both formed on the glass substrate 23.

In this case, for two lights of different wavelengths $\lambda 1$ and $\lambda 2$, the wavelength plate (or wavelength film) C24 formed between the glass substrates 21 and 22 has an optical thickness that allows the application of a phase difference to the wavelength λ1 which difference is an integral multiple of the wavelength λ1, that is, m·λ1 (m=1, 2, 3, . . . ), while allowing the application of a phase difference (k+1/2)·λ2 (k=0, 1, 2, . . . ) to the wavelength λ2.

On the other hand, the wavelength plate A26 formed between the glass substrates 22 and 23 has an optical thickness that allows the application of a phase difference (N+1/4)·λ1 (N=1, 2, 3, . . . ) to the wavelength λ1, while allowing the application of a phase difference to the wavelength λ2 which is an integral multiple of the wavelength λ2, that is, M·λ2 (M=1, 2, 3, . . . ).

Lights emitted from two light sources with different wavelengths have orthogonal polarizing directions. Before entering an optical element 31, a light of a wavelength λ1 (linearly polarized light of which the polarizing direction is parallel with the sheet of the drawing) is reflected by a wavelength separating filter 30, and a light of a wavelength λ2 (linearly polarized light of which the polarizing direction is perpendicular to the sheet of the drawing) passes through the wavelength separating filter 30.

Accordingly, immediately before impinging on the optical element 31, the two lights of the different wavelengths have orthogonal polarizing directions, and the polarizing hologram 25 is arranged in the direction in which its grating is invisible to the linearly polarized light of the wavelength λ1 on the forward path.

That is, upon passing through the wavelength plate C24, the light of the wavelength λ1 as an incident light is not affected by the polarizing state because it has a wavelength equal to an integral multiple of the wavelength λ1. On the forward path, this light has the polarizing direction in which the grating of the polarizing hologram 5 is invisible, and thus passes through the element without being diffracted by the polarizing hologram 25.

The transmitted light is converted into a circularly polarized light by the wavelength plate A26 having the optical thickness that meets (N+1/4)·λ1 (N=1, 2, 3, . . . ), and this circularly polarized light exits the optical element 31.

On the other hand, the light of the wavelength λ1 of the backward path as a reflected light, reflected by the reflector 27, is totally diffracted by the polarizing hologram 25 because it is converted, by the wavelength plate A26, into a linearly polarized light of which the polarizing direction is orthogonal to that of the forward path. However, the diffracted light passes through the optical element 31 without being affected by the polarizing state as in the case with the forward path (incident light).

On the other hand, the wavelength plate C24 subjects the light of the wavelength λ2 as an incident light to the phase difference (k+1/2)·λ2 (k=0, 1, 2, . . . ) to rotate its polarizing direction through 90°. The light of the wavelength λ2 having its polarizing state rotated through 90° is not diffracted by the polarizing hologram 25 because it has the same polarizing direction as that of the incident light of the wavelength λ1. The light of the wavelength λ2 transmitted through the polarizing hologram 25 is not affected its the polarizing state established by the wavelength plate C24, but has its aperture restricted by the aperture restricting film 28 formed on the glass substrate 23 before only the part of the light which impinges on an area B passes through the optical element 31.

The light transmitted through the optical element 31 is reflected by the reflector 27, and then passes through the wavelength plate A 26 and the polarizing hologram 25 without being affected by the polarizing state or diffracted, to become a linearly polarized light having its polarization plane rotated through 90° again by the wavelength plate C24.

According to the optical element of this embodiment, such an element configuration enables the wavelength plate C24 to establish a uniform polarizing state all over the aperture using a single optical element even if lights from two laser light sources having different wavelengths have orthogonal polarizing directions.

Further, in this embodiment, as an example of an aperture restricting means according to the present invention, the aperture restricting film is used as in the case with the conventional example, but the aperture restricting means may comprise a wavelength-selective diffraction grating, that is, a grating that has such a phase depth that allows one of two different wavelengths to be diffracted while precluding the other from being diffracted, a physical diaphragm that performs an electric switching operation, a liquid crystal shutter, or the like. In this case, in the single element, the presence of aperture restriction and the presence of diffraction effect of the polarization grating are clarified for two lights having polarizations perpendicular to each other and different wavelength. Further, the aperture restricting means may be free from the phase compensating film.

In the above embodiments, the wavelength plate 46 corresponds to the first wavelength plate of the present invention, the wavelength plate A6 corresponds to the first wavelength plate of the present invention, the wavelength plate B4 corresponds to the second wavelength plate of the present invention, the wavelength plate A26 corresponds to the first wavelength plate of the present invention, the wavelength plate C24 corresponds to the second wavelength plate of the present invention, the aperture restricting films 48 and 28 or the wavelength plate B24 and the polarizing hologram 5 corresponds to the aperture restricting means of the present invention, the polarizing holograms 5, 25, and 42 each correspond to the polarizing hologram of the present invention, the semiconductor laser 101 corresponds to the first laser light source of the present invention, the semiconductor laser 115 corresponds to the second laser light source of the present invention, the collimator lens 102, condensing lens 111, wavelength separating filter 103, and beam shaking prism 104 are an example of a condensing means of the present invention, the objective lens 107 is an example of an objective means of the present invention, an actuator movable unit 106 is an example of the actuator of the present invention, and the photodetectors 106 and 109 and hologram 114 are an example of a detecting means of the present invention.

Further, the phase differences applied by the wavelength plates 46, A6, A26, B4, and C24 are as described in the embodiments, the phase differences applied by the first and second wavelength plates of the present invention are not limited to the above described ones. The wavelength plate of the present invention having the first and second wavelength plates has only to apply such phase differences that for a first and a second incident lights having different wavelengths λ1 and λ2 and a first and second reflected lights generated when the first and second incident lights are reflected by a reflector, the polarizing state of all or part of the first incident and reflected lights or the second incident and reflected lights is varied.

Furthermore, the above embodiments have been described in conjunction with the optical elements, but the present invention may be implemented as an information recording and reproducing method of irradiating each of two different types of recording media with a first incident light or a second incident light which are linearly polarized lights having substantially orthogonal polarizing directions and which have different wavelengths λ1 and λ2, respectively, to obtain a first reflected light generated when the first incident light is reflected from one of the recording media or a second reflected light generated when the second incident light is reflected from the other recording medium, thereby recording or reproducing information on or from the two types of recording media, the method comprising the steps of receiving the first incident light or the second incident light and allowing the first and second reflected lights to pass through again, allowing the first incident light, the second incident light, or the second reflected light to pass through upon receiving these lights, and diffracting the first reflected light upon receiving this light, and varying a polarizing state of all or part of the first incident light and reflected light or the second incident light and reflected light.

Moreover, the present invention may be implemented as a single polarizing hologram such as the polarizing hologram 5, 25, or 42.

As is apparent from the above description, if lights incident on the optical element have orthogonal polarizing directions, the present invention enables a single optical element to turn on and off the transmitting, diffracting, and aperture-restricting functions between the forward and backward paths, thereby eliminating the need for a half wavelength plate to simplify the optical system. Therefore, the size and costs of an optical pickup using this optical element can be reduced.

What is claimed is:

1. An optical element that receives a first incident light and a second incident light through a main surface and allowing the first and second incident lights to be transmitted therethrough, the first and second incident lights being linearly polarized lights having substantially orthogonal polarizing directions and having different wavelengths $\lambda 1$ and $\lambda 2$ respectively, the optical element receiving a first reflected light and a second reflected light generated when said first and second incident lights are reflected from a reflector through the other face, and allowing the first and second reflected lights to be transmitted therethrough again, the optical element comprising:

a polarizing hologram that allows said first incident light, said second incident light, and said second reflected light to be transmitted therethrough upon receiving these lights and that diffracts said first reflected light upon receiving this light; and at least one wavelength plate that varies at least one of polarizing states of all of said first incident light and reflected light and polarizing states of all or part of said second incident light and reflected light.

2. The optical element according to claim 1, further comprising aperture restricting means of allowing said first incident light to be transmitted through the optical element, while reducing a transmission area of said second incident light.

3. The optical element according to claim 1 or 2, wherein said wavelength plate causes a phase difference of $(N+1/4) \cdot \lambda 1$ ($N=1, 2, 3, \ldots$) in light having a wavelength $\lambda 1$ of said first incident light and reflected light, and causes a phase difference of $M \cdot \lambda 2$ ($M=1, 2, 3, \ldots$) in light having a wavelength $\lambda 2$ of said second incident light and reflected light, and wherein when a difference of the reference indexes between groove portions of said polarizing hologram is defined as $\Delta n1$ for said first incident light, as $\Delta n2$ for a light having the same wavelength as the first incident light and having a polarizing direction orthogonal to that of the first incident light, and as $\Delta n2'$ for said second incident light, a depth d of the groove portion of the polarizing hologram meets the following relationship:

$d = m \cdot \lambda 1 \cdot (1/\Delta n1)$ ($m=0, 1, 2, 3, \ldots$)

$d = (2k-1) \cdot \lambda 1 \cdot (1/\Delta n2)$ ($k=1, 2, 3, \ldots$)

$d = L \cdot \lambda 2 \cdot (1/\Delta n2')$ ($L=0, 1, 2, 3, \ldots$).

4. The optical element according to claim 1 or 2, wherein said wavelength plate comprises a first wavelength plate and a second wavelength plate, and wherein said first wavelength plate and said second wavelength plate are arranged opposite each other via said polarizing hologram.

5. The optical element according to claim 4, wherein said second wavelength plate is provided on a side of the optical element on which the second wavelength plate can receive said first and second incident lights.

6. The optical element according to claim 5, wherein said first wavelength plate causes a phase difference of $(N+1/4) \cdot \lambda 1$ ($N=1, 2, 3, \ldots$) in light having a wavelength $\lambda 1$ of said first incident light and reflected light, and causes a phase difference of $M \cdot \lambda 2$ ($N=1, 2, 3, \ldots$) in light having a wavelength $\lambda 2$ of said second incident light and reflected light, and wherein said second wavelength plate causes a phase difference in light having said wavelength $\lambda 1$ which difference is an integral multiple of the wavelength $\lambda 1$, and causes a phase difference of $(m+1/2) \cdot \lambda 2$ ($m=0, 1, 2, \ldots$) in light having said wavelength $\lambda 2$.

7. The optical element according to claim 4, wherein said second wavelength plate and said polarizing hologram function as aperture restricting means of reducing a transmission area of light passing therethrough.

8. The optical element according to claim 5, wherein said first wavelength plate causes a phase difference of $(N+1/4) \cdot \lambda 1$ ($N=1, 2, 3, \ldots$) in light having a wavelength $\lambda 1$ of said first incident light and reflected light, and causes a phase difference of $M \cdot \lambda 2$ ($M=1, 2, 3, \ldots$) in light having a wavelength $\lambda 2$ of said second incident light and reflected light, and wherein said second wavelength plate has a first area that causes a phase difference of $m \cdot \lambda 1$ ($m=1, 2, 3, \ldots$) in light having said wavelength $\lambda 1$ and that causes a phase difference of $(k+1/2) \cdot \lambda 2$ ($k=0, 1, 2, \ldots$) in light having said wavelength $\lambda 2$, and a second area that causes a phase difference in light having either of said wavelengths $\lambda 1$ and $\lambda 2$ which difference is an integral multiple of the respective wavelengths.

9. An optical pickup comprising:

an optical element set forth in any of claims 1 or 2;

a first laser light source and a second laser light source that emit a first incident light and a second incident light, respectively, which are linearly polarized lights having substantially orthogonal polarizing directions and which have different wavelengths $\lambda 1$ and $\lambda 2$;

condensing means of condensing said first incident light and said second incident light;

objective lens means of condensing light emitted from said condensing means, on a reflector, the objective lens means having said optical element mounted thereon;

an actuator that finely moves said objective lens means; and detecting means of detecting a first reflected light generated when said first incident light is reflected from said reflector and a second reflected light generated when said second incident light is reflected from said reflector.

10. An information recording and reproducing method of irradiating each of two different types of recording media with a first incident light or a second incident light which are linearly polarized lights having substantially orthogonal polarizing directions and which have different wavelengths $\lambda 1$ and $\lambda 2$, respectively, to obtain a first reflected light generated when the first incident light is reflected from one of said recording media or a second reflected light generated when the second incident light is reflected from the other recording medium, thereby recording or reproducing information on or from said two types of recording media; the method comprising the steps of:

receiving the first reflected light or the second reflected light and allowing the first and second reflected lights to pass through again;

allowing said first incident light, said second incident light, or said second reflected light to pass through upon receiving these lights, and diffracting said first reflected light upon receiving this light; and varying at least one of polarizing states of all of said first incident light and reflected light and polarizing states of all or part of said second incident light and reflected light.

11. A polarizing hologram wherein when a difference of the refractive indexes between groove portions of said polarizing hologram is defined as $\Delta n1$ for a first incident light, as $\Delta n2$ for a light having the same wavelength as said first incident light and having a polarizing direction orthogonal to that of the first incident light, and as $\Delta n2'$ for a second incident light, the first incident light has a wavelength $\lambda 1$ and the second incident light has a wavelength $\lambda 2$;

a depth d of the groove portion of the polarizing hologram meets the following relationship:

$d = m \cdot \lambda 1 \cdot (1/\Delta n1)$ $(m = 0, 1, 2, 3, \ldots)$ $d = (2k-1) \cdot \lambda 1 \cdot$ $(1/\Delta n2) \ (k = 0, 1, 2, 3, \ldots)$ $d = L \cdot \lambda 2 \cdot (1/\Delta n2')$ $(L = 0, 1, 2, 3, \ldots).$

* * * * *